(12) United States Patent
Inoue

(10) Patent No.: US 9,239,692 B2
(45) Date of Patent: Jan. 19, 2016

(54) COMMUNICATION APPARATUS PERFORMING COMMUNICATION SPEED CHANGING PROCESS, COMMUNICATION CONTROL METHOD AND STORAGE MEDIUM

(71) Applicant: CANON KABUSHIKI KAISHA, Tokyo (JP)

(72) Inventor: Go Inoue, Fujisawa (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/552,760

(22) Filed: Nov. 25, 2014

(65) Prior Publication Data
US 2015/0153968 A1 Jun. 4, 2015

(30) Foreign Application Priority Data

Nov. 29, 2013 (JP) ................................. 2013-247633

(51) Int. Cl.
*G06K 15/00* (2006.01)
*G06F 3/12* (2006.01)
*H04L 1/16* (2006.01)
*G06K 15/02* (2006.01)
*H04N 1/00* (2006.01)

(52) U.S. Cl.
CPC ................ *G06F 3/121* (2013.01); *G06F 3/122* (2013.01); *G06F 3/1234* (2013.01); *G06F 3/1236* (2013.01); *G06F 3/1285* (2013.01); *G06K 15/02* (2013.01); *G06K 15/1817* (2013.01); *G06K 15/1821* (2013.01); *H04L 1/1685* (2013.01); *H04N 1/00127* (2013.01)

(58) Field of Classification Search
None
See application file for complete search history.

(56) References Cited

U.S. PATENT DOCUMENTS

| 8,339,629 | B2 | 12/2012 | Maki | |
|---|---|---|---|---|
| 2003/0056146 | A1* | 3/2003 | Freeman et al. | 714/25 |
| 2006/0017964 | A1* | 1/2006 | Maki | 358/1.15 |
| 2012/0107030 | A1* | 5/2012 | Goto | 400/76 |
| 2012/0293835 | A1* | 11/2012 | Amano | 358/1.15 |
| 2013/0021646 | A1* | 1/2013 | Ichikawa | 358/1.15 |

FOREIGN PATENT DOCUMENTS

| JP | 05232058 A | 9/1993 |
|---|---|---|
| JP | 2004064665 A | 2/2004 |
| JP | 4324048 B2 | 9/2009 |

* cited by examiner

*Primary Examiner* — Miya J Cato
(74) *Attorney, Agent, or Firm* — Rossi, Kimms & McDowell LLP

(57) ABSTRACT

A communication apparatus which realizes communication flow control which is capable of preventing decrease in reception performance without causing disappearance of communication data. A first storage unit stores data transmitted from an external apparatus. A second storage unit stores data transferred from the first storage unit. A determination unit determines, in a case of executing communication with the external apparatus, determine a notification size to be notified to the external apparatus as a size of data that can be received by the communication apparatus on a basis of a size of a free space of the first storage unit and a size of a free space of the second storage unit. A notification unit notifies the notification size determined by the determination unit to the external apparatus.

8 Claims, 8 Drawing Sheets

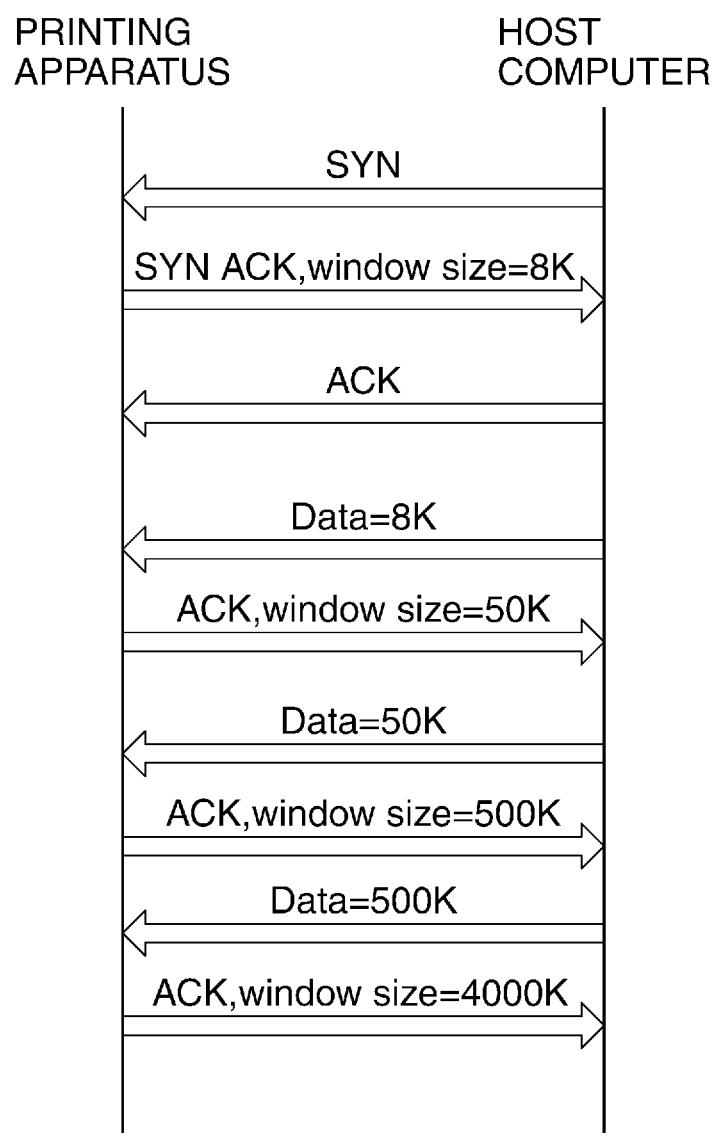

COMMUNICATION APPARATUS PERFORMING COMMUNICATION SPEED CHANGING PROCESS, COMMUNICATION CONTROL METHOD AND STORAGE MEDIUM

BACKGROUND OF THE INVENTION

1. Field of the Invention

The present invention relates to a communication apparatus, a communication control method and a storage medium, and more particularly, to a method for controlling a process for changing communication speed.

2. Description of the Related Art

There is known a communication method of performing communication flow control using a window size (see, for example, Japanese Laid-Open Patent Publication (Kokai) No. 2004-064665). In this communication method, since a transmitting side (for example, a host computer (client computer)) can transmit data corresponding to a window size shown by a receiving side (for example, a printing apparatus) without an acknowledgement packet from the receiving side, the number of acknowledgements required can be suppressed. Therefore, communication efficiency can be improved by increasing the window size.

However, for example, in some connection-type communication methods using TCP (Transmission Control Protocol), when connection with a receiving side is established, a transmitting side starts transmission of print data immediately after the establishment, and the process normally ends as soon as the transmission of the print data ends. In this case, if the receiving side is in a state of not being able to receive the print data, the received print data is discarded on the receiving side. As a result, it seems to the user that the print data has disappeared because a sheet on which the print data is printed is not discharged from the receiving side though the process of transmitting the print data is successful.

As an example, FIG. 6A shows an example of a communication flow in a case where disappearance of print data may occur. Here, it is assumed that a window size of a printing apparatus, which is a receiving side, is 8 Kbytes, and that a host computer, which is a transmitting side, transmits print data with a size of 5 Kbytes to the printing apparatus. When the window size is larger than the print data size as described above, the host computer transmits the whole print data to the printing apparatus without waiting for an acknowledgement from the printing apparatus. Therefore, when the printing apparatus is in a printing-disabled state, disappearance of the print data occurs. It should be noted that, in FIG. 6A, "SYN", "ACK" and "FIN" represent synchronization (a connection request), a reception acknowledgement and end of transmission, respectively.

In order to cope with this problem, there is proposed a data disappearance preventing function of, by uniformly reducing an initial window size with which a receiving side responds so that a transmitting side cannot transmit all print data at a time, preventing occurrence of disappearance of the print data (for example, see Japanese Patent No. 4324048). FIG. 6B shows an example of a communication flow in a case where an initial window size of a receiving side is set small. Here, it is assumed that, when the initial window size of a printing apparatus, which is the receiving side, is set to 1 Kbyte, a transmitting-side host computer transmits print data with a total size of 5 Kbytes to the printing apparatus.

In this case, when the printing apparatus is in a printing-disabled state, the host computer cannot transmit subsequent print data after the first 1 Kbyte to the printing apparatus and, therefore, enters in a state of waiting for a response from the printing apparatus. When the host computer receives a negative acknowledgement from the printing apparatus, a print data transmission error occurs, and the user can confirm that a transmission error has occurred. It should be noted that, in FIG. 6B, "SYN" and "ACK" represent the same as in FIG. 6A, and "RST" represents reset but has the same meaning as "negative acknowledgement" here.

There is also proposed a protocol stack equipped with an automatic receive-window tuning function in order to improve communication performance (see, for example, Japanese Laid-Open Patent Publication (Kokai) No. 05-232058). FIG. 7A shows an example of a communication flow of performing automatic tuning of a receive window. The automatic receive-window tuning function is a function of a receiving-side printing apparatus dynamically changing a window size according to a data transmission speed of a transmitting-side printing apparatus. Thus, as the host computer transmits data without delay, the receiving side gradually increases the window size, and, thereby, high-speed communication can be realized.

However, when the data disappearance preventing function described before is realized in a printing apparatus which adopts the automatic receive-window tuning function, there may be a case where print data reception performance in the printing apparatus decreases. FIG. 7B shows an example of a communication flow in the case where the reception performance decreases.

For example, in an environment with a lot of network traffic or a network environment where a transmitting side and a receiving side are physically far away from each other, the data transmission speed of the transmitting side seems to be slow when seen from the receiving side. Therefore, the receiving side judges that it is not necessary to further increase the window size and continues data reception without increasing the size from the initial window size. That is, because the initial window size is 1 Kbyte, and the window size is not changed, it is necessary to perform a total of one hundred times of transmission/reception when the transmitting side wants to transmit print data with a total of 100 Kbytes, and a lot of time is required for transmission/reception of the print data. In comparison, for example, if the automatic receive-window tuning function works, and the second and third window sizes are changed to 50 Kbytes and 500 Kbytes, respectively, transmission of the print data is completed by a total of three times of transmission/reception.

As described above, a conventional communication flow has a problem that decrease in reception performance may become remarkable when it is attempted to solve the data disappearance problem, and, on the other hand, the data disappearance problem becomes remarkable when the initial window size is increased in order to improve the reception performance.

SUMMARY OF THE INVENTION

The present invention provides a communication apparatus which realizes communication flow control capable of preventing decrease in reception performance without causing disappearance of communication data, a communication control method and a storage medium.

Accordingly, a first aspect of the present invention provides a communication apparatus communicable with an external apparatus, comprising a first storage unit configured to store data transmitted from the external apparatus, a second storage unit configured to store data transferred from the first storage unit, a determination unit configured to, in a case of executing communication with the external apparatus, determine a notification size to be notified to the external apparatus as a size of data that can be received by the communication apparatus on a basis of a size of a free space of the first storage unit and a size of a free space of the second storage unit, and a notification unit configured to notify the notification size determined by the determination unit to the external apparatus.

Accordingly, a second aspect of the present invention provides a communication control method for a communication apparatus communicable with an external apparatus comprising a first storage unit configured to store data transmitted from the external apparatus and a second storage unit configured to store data transferred from the first storage unit, the communication control method comprising a determination step of, in a case of executing communication with the external apparatus, determining a notification size to be notified to the external apparatus as a size of data that can be received by the communication apparatus on a basis of a size of a free space of the first storage unit and a size of a free space of the second storage unit, and a notification step of notifying the notification size determined in the determination step to the external apparatus.

Accordingly, a third aspect of the present invention provides a computer-readable non-transitory storage medium storing a program for causing a computer to implement a communication control method for a communication apparatus communicable with an external apparatus comprising a first storage unit configured to store data transmitted from the external apparatus and a second storage unit configured to store data transferred from the first storage unit, the communication control method comprising a determination step of, in a case of executing communication with the external apparatus, determining a notification size to be notified to the external apparatus as a size of data that can be received by the communication apparatus on a basis of a size of a free space of the first storage unit and a size of a free space of the second storage unit, and a notification step of notifying the notification size determined in the determination step to the external apparatus.

In the present invention, a communication apparatus which receives data includes the first storage unit configured to store data transmitted from the external apparatus and the second storage unit configured to store data transferred from the first storage unit. The data size which can be received by the communication apparatus is determined on the basis of the sizes of free spaces of the first storage unit and the second storage unit, and the external apparatus is notified of the receivable data size. Thereby, it is possible to realize communication flow control which prevents decrease in reception performance without causing disappearance of data.

Further features of the present invention will become apparent from the following description of exemplary embodiments (with reference to the attached drawings).

BRIEF DESCRIPTION OF THE DRAWINGS

FIG. 7A is a diagram showing an example of a communication flow of performing automatic receive-window tuning in the conventional technique.

DESCRIPTION OF THE EMBODIMENTS

An embodiment of the present invention will be described in detail below with reference to accompanying drawings. Here, a printing apparatus (printer) which receives print data and performs printing on a sheet as a communication apparatus according to the present invention. The communication apparatus according to the present invention, however, is not limited to a printing apparatus, and communication data is not limited to print data. The present invention is applicable to a communication apparatus which receives various kinds of data via a network or a telephone line.

Figure 1:
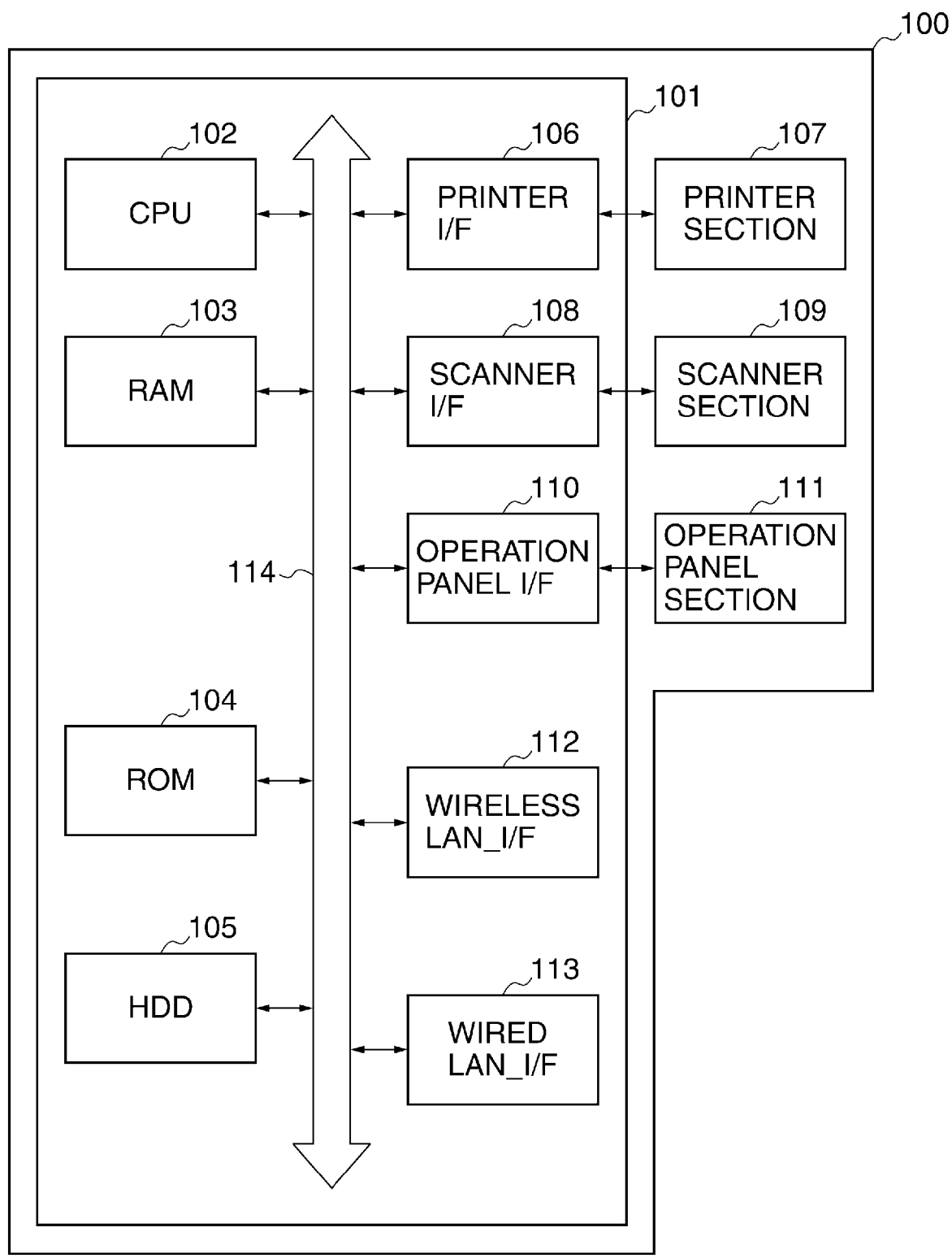
FIG. 1 is a block diagram showing an outline of a hardware configuration of a printing apparatus according to an embodiment of the present invention.

FIG. 1 is a block diagram showing an outline of a hardware configuration of a printing apparatus 100 according to the embodiment of the present invention. The printing apparatus 100 is provided with a control section 101, a printer section 107, a scanner section 109 and an operation panel section 111. The control section 101 is provided with a CPU 102, a RAM 103, a ROM 104, an HDD 105, a printer I/F 106, a scanner I/F 108, an operation panel I/F 110, a wireless LAN_I/F 112 and a wired LAN_I/F 113 which are connected to a system bus 114.

The control section 101 controls the whole operation of the printing apparatus 100. The CPU 102 reads out a control program stored in the ROM 104 and various kinds of programs and the like stored in the HDD 105 and performs various kinds of controls such as communication control. The RAM 103 is used as a temporary region, such as a main memory and a work area of the CPU 102. The HDD 105 stores data, the various kinds of programs, various kinds of information tables and the like.

The printer I/F 106 connects the printer section (printer engine) 107 and the control section 101. The printer section 107 executes a printing process for a medium such as a piece of paper (sheet) fed from a paper cassette not shown, on the basis of print data inputted via the printer I/F 106. The scanner I/F 108 connects the scanner section 109 and the control section 101. The scanner section 109 reads from an original sheet placed thereon and generates image data. The image data generated by the scanner section 109 is printed by the printer section 107 and stored in the HDD 105 or transmitted to an external apparatus via the wireless LAN_I/F 112 or the wired LAN_I/F 113. The operation panel I/F 110 connects the operation panel section 111 and the control section 101 and transmits an input instruction from various kinds of buttons (keys) or a touch panel that the operation panel section 111 is provided with, which are not shown, to the control section 101.

The wireless LAN_I/F 112 is an interface for enabling execution of wireless communication with an external apparatus connected via a wireless LAN. A LAN cable (Ethernet®) cable) is connected to the wired LAN_I/F 113. The wired LAN_I/F 113 is an interface for enabling communication with an external apparatus via a LAN cable. The printing apparatus 100 receives print data from an external apparatus by wireless communication via the wireless LAN_I/F 112 and/or wired communication via the wired LAN_I/F 113 and executes a printing process by the printer section 107 on the basis of the received print data. The printing apparatus 100 can also transmit image data generated by the scanner section 109 to an external apparatus via the wireless LAN_I/F 112 and/or the wired LAN_I/F 113.

It should be noted that, in the present embodiment, the printing apparatus 100 is assumed to execute each of processes in accordance with flowcharts to be described later by one CPU 102 using one memory (RAM 103). The printing apparatus 100, however, is not limited to such a configuration. For example, a configuration is also possible in which a plurality of CPUs and memories coordinate with one another to execute each of the processes in accordance with the flowchart to be described later.

Figure 2:
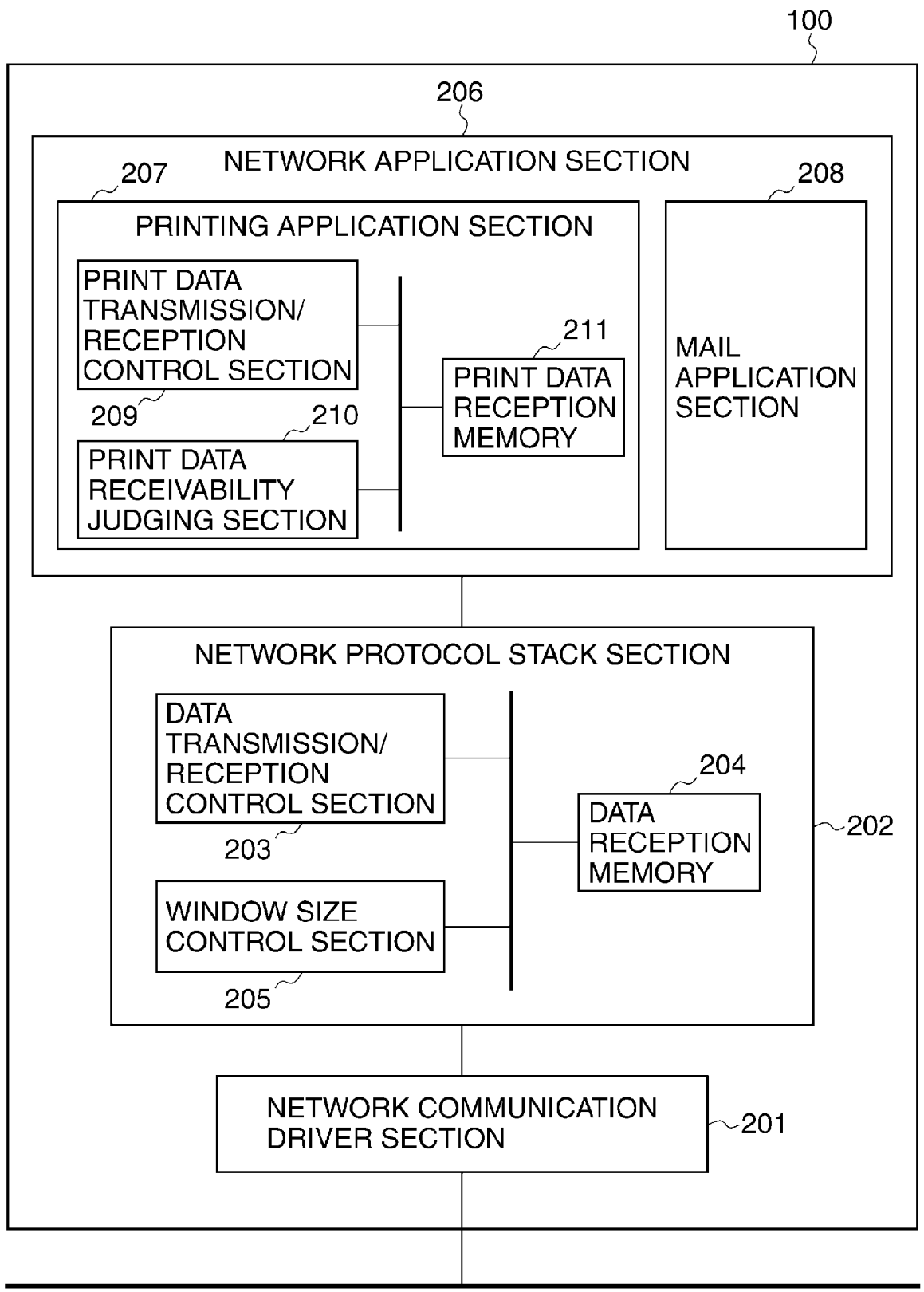
FIG. 2 is a diagram showing an outline of a software configuration of the printing apparatus in FIG. 1.

FIG. 2 is a diagram showing an outline of a software configuration of the printing apparatus 100. Each of functional sections shown in FIG. 2 is realized by the CPU 102 of the printing apparatus 100 executing a predetermined control program. The printing apparatus 100 is provided with a network communication driver section 201, a network protocol stack section 202 and a network application section 206 as software.

The network communication driver section 201 controls the wireless LAN_I/F 112 and the wired LAN_I/F 113 to control transfer of signals to and from an external apparatus connected to the network.

The network protocol stack section 202 includes a data transmission/reception control section 203, a data reception memory 204 and a window size control section 205. The data transmission/reception control section 203 controls transfer of data received via the network communication driver section 201 to the network application section 206 and transfer of transmit data from the network application section 206 to the network communication driver section 201. The data reception memory 204 is a buffer memory which temporarily stores all data received by the network protocol stack section 202 (first storage unit). The data reception memory 204 stores receive data until receiving a read request from the network application section 206. The data reception memory 204 transfers the stored receive data to the network application section 206 in accordance with the read request received from the network application section 206, and deletes the stored receive data when the data transfer to the network application section 206 is completed. The window size control section 205 judges the availability of the data reception memory 204 and the data transmission speed from an external apparatus to determine the window size with which the network protocol stack section 202 is to respond. The window size control section 205 decreases the window size when the space of the data reception memory 204 decreases, and increases the window size when the space of the memory is large, and the data transmission speed from the external apparatus is high.

The network application section 206 is configured with various applications using network communication and includes a printing application section 207 and a mail application section 208. The printing application section 207 further includes a print data transmission/reception control section 209, a print data receivability judging section 210 and a print data reception memory 211.

The print data transmission/reception control section 209 receives print data from the network protocol stack section 202 and transfers the print data to the printer section 107 as image data. The print data reception memory 211 is a buffer memory which temporarily stores the received print data (second storage unit). When transfer of the image data to the printer section 107 ends, the print data is deleted from the print data reception memory 211. The print data receivability judging section 210 judges availability of the memory of the print data reception memory 211 and an error occurrence state in the printer section 107 and judges whether printing is possible or not.

Figure 3:
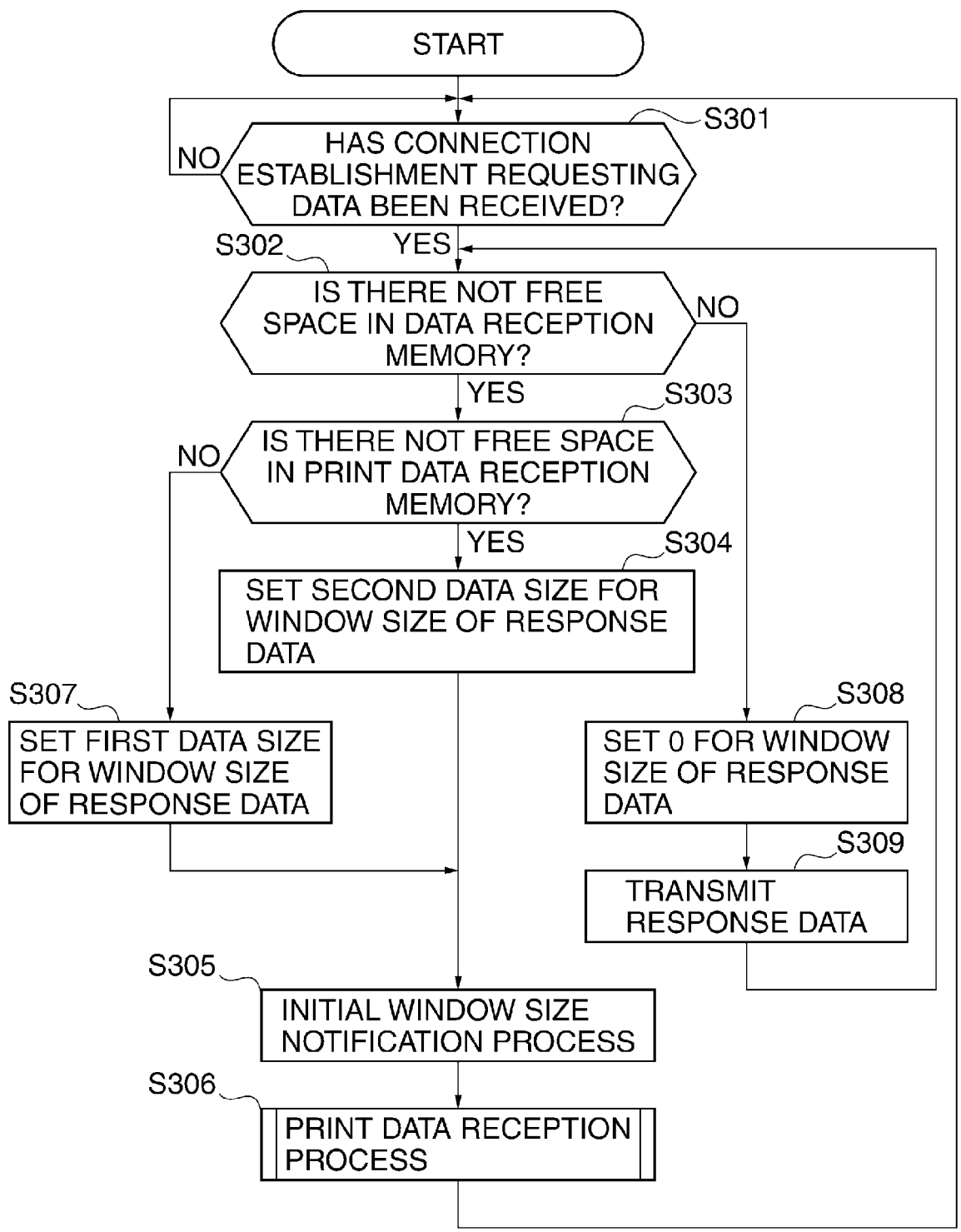
FIG. 3 is a flowchart of a window size control process at the time of receiving data in the printing apparatus in FIG. 1.

FIG. 3 is a flowchart of a window size control process at the time of receiving data in the printing apparatus 100. Each process shown in FIG. 3 is realized by the CPU 102 developing a predetermined program stored in the ROM 104 or the HDD 105 on the work area of the RAM 103 and executing the program.

In step S301, the CPU 102 judges whether or not connection establishment requesting data has been received from an external apparatus by the network communication driver section 201 and waits until receiving a connection establishment requesting data (S301: NO). When receiving a connection establishment requesting data (S301: YES), the CPU 102 transfers the receive data to the data transmission/reception control section 203 by the network communication driver section 201. Then, in step S302, the CPU 102 judges whether or not there is a free buffer memory space in the data reception memory 204 then by the window size control section 205.

If there is not a free buffer memory space in the data reception memory 204 (S302: NO), the CPU 102 advances the process to step S308. In step S308, the CPU 102 sets "0" for the window size of response data by the window size control section 205. After that, in step S309, the CPU 102 transmits the response data to the external apparatus via the network communication driver section 201 by the data transmission/reception control section 203. After that, the CPU 102 returns the process to step S302 to perform monitoring until a free buffer memory space occurs in the data reception memory 204 by the window size control section 205.

If there is a free buffer memory space in the data reception memory 204 (S302: YES), the CPU 102 advances the process to step S303. In step S303, the CPU 102 judges whether or not there is a free buffer memory space in the print data reception memory 211 by the window size control section 205. It should be noted that a method of the window size control section 205 directly referring to the print data reception memory 211 to confirm the availability is used for the judgment in step S303. Alternatively, a method of the window size control section 205 inquiring of the print data receivability judging section 210 and the print data receivability judging section 210 referring to the print data reception memory 211 to confirm the availability may be used for the judgment in step S303.

If there is not a free buffer memory space in the print data reception memory 211 (S303: NO), the CPU 102 advances the process to step S307. In step S307, the CPU 102 sets a small value (hereinafter referred to as a "first data size"), for example, 1 Kbyte for the initial window size of the response data by the window size control section 205. This first data size is required to be a value smaller than the size of print data transmitted to the printing apparatus 100 by the external apparatus. The first data size may be changeable by operating the operation panel section 111 so that the user can change the setting to any arbitrary value. The set initial window size is stored in the HDD 105 or the RAM 103.

If there is a free buffer memory space in the print data reception memory 211 (S303: YES), the CPU 102 advances the process to step S304. In step S304, the CPU 102 sets a value sufficiently larger than the first data size (hereinafter referred to as a "second data size"), for example, 10 Kbytes for the initial window size of the response data by the window size control section 205. This second data size may be the initial set value of the network protocol stack section 202 of the printing apparatus 100 or may be changeable to any arbitrary setting by the user operating the operation panel section 111. The set initial window size is stored in the HDD 105 or the RAM 103.

After step S304 or S307, the CPU 102 advances the process to step S305. In step S305, the CPU 102 transmits the response data which includes the initial window size set in step S304 or S307, to the external apparatus via the network communication driver section 201 by the data transmission/reception control section 203. In the next step S306, the CPU 102 performs a print data reception process via the network communication driver section 201. After step S306 ends, the CPU 102 returns the process to step S301.

It should be noted that, in step S303 described above, whether or not there is a free buffer memory space in the print data reception memory 211 is judged by the number of jobs or total size of the received print data. For example, when receiving the 101st job in a case where the printing apparatus 100 is capable of performing the printing process for up to one hundred jobs, the printing apparatus 100 judges that there is not a free buffer memory space in the print data reception memory 211. Furthermore, when receiving print data with a size exceeding 1 Gbyte in a case where the print data reception memory 211 is secured as a buffer memory for received print data with a size of up to 1 Gbyte, the printing apparatus 100 judges that there is not a free buffer memory space in the print data reception memory 211.

Figure 4:
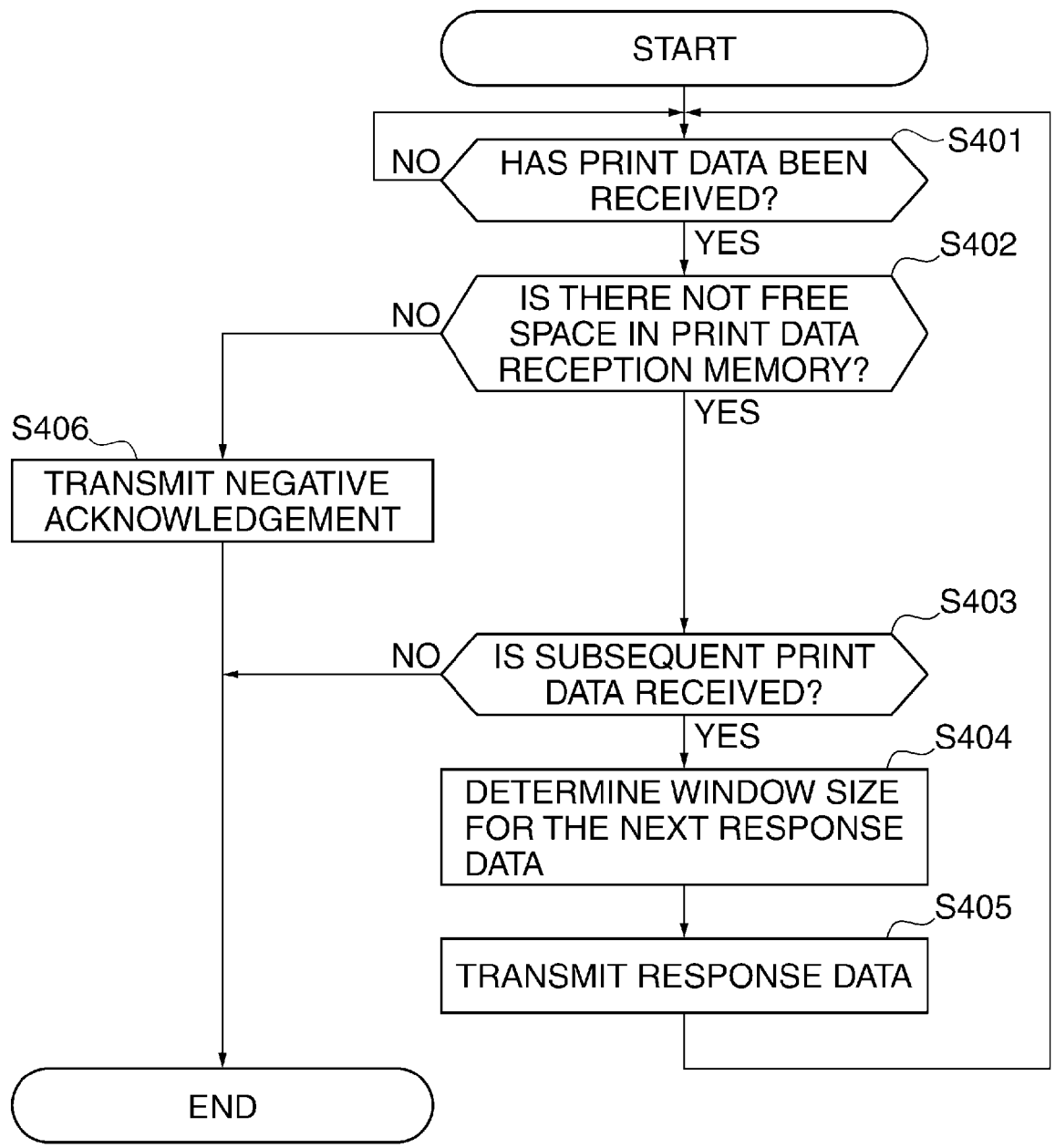
FIG. 4 is a flowchart of a print data reception process executed in step S306 in FIG. 3.

FIG. 4 is a flowchart of the print data reception process executed in step S306. When the CPU 102 of the printing apparatus 100 notifies the external apparatus of the initial window size via the network communication driver section 201, only print data corresponding to the notified initial window size (hereinafter referred to as "the first print data") is transmitted from the external apparatus which has received the notification. When ending transmission of the first print data, the external apparatus stops transmission without transmitting subsequent print data.

In step S401, the CPU 102 first judges whether the first print data has been received or not via the network communication driver section 201 and waits until the first print data is received (S401: NO). It should be noted that the first print data received by the network communication driver section 201 is transferred to the data transmission/reception control section 203 and then the print data transmission/reception control section 209, and whether the print data transmission/reception control section 209 has received the first print data or not is a criterion for judging whether the first data has been received or not.

When judging that the first print data has been received (S401: YES), the CPU 102 advances the process to step S402. In step S402, the CPU 102 judges whether or not there is a free buffer memory space in the print data reception memory 211 then by the print data receivability judging section 210. If judging that there is not a free buffer memory space in the print data reception memory 211 (S402: NO), the CPU 102 advances the process to step S406.

Figure 6A:
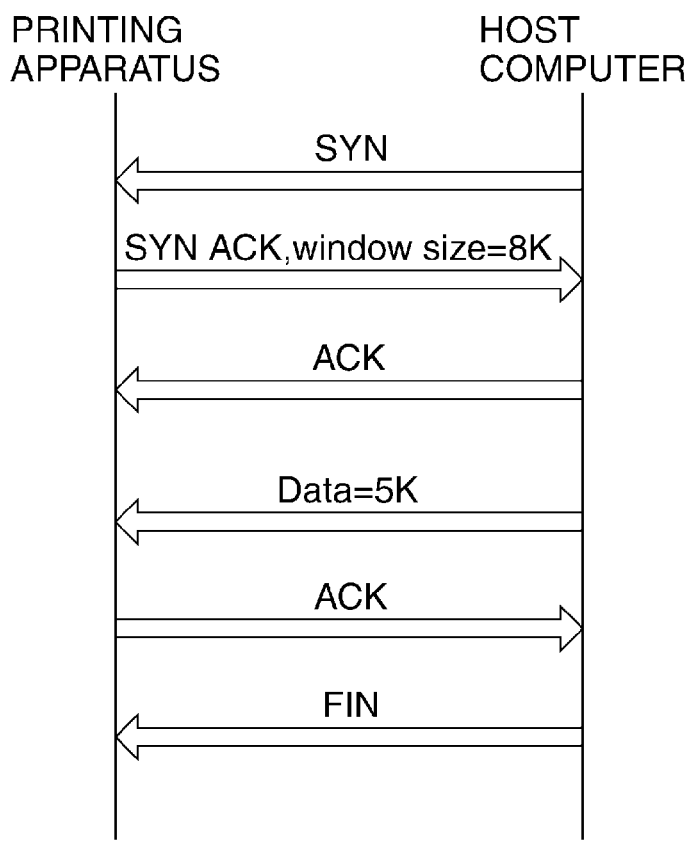
FIG. 6A is a diagram showing an example of a communication flow in a case where disappearance of print data may occur in a conventional technique.
Figure 6B:
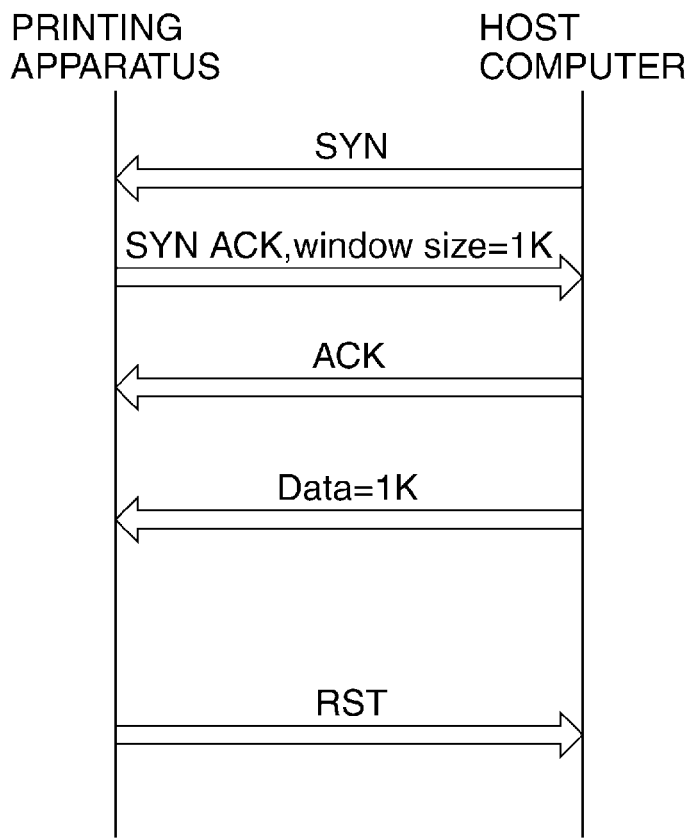
FIG. 6B is a diagram showing an example of a communication flow in a case where an initial window size on a receiving side is set small in the conventional technique.

In step S406, since it is not possible to receive the print data, the CPU 102 transmits a negative acknowledgement to the printing request to the external apparatus via the network communication driver section 201 by the print data transmission/reception control section 209. For example, when the initial window size is 1 Kbyte, the external apparatus can receive this negative acknowledgement only when the size of the print data is larger than 1 Kbyte, and, therefore, the job disappearance problem does not occur. Thus, the external apparatus can judge that the transmission of the print data has abnormally ended halfway and can notify the user thereof if necessary. It should be noted that a communication flow in the case of setting a small value to the window size is similar to that of FIG. 6B described as the conventional technique. After execution of step S406, the present process ends.

If judging in step 402 that there is a free buffer memory space in the print data reception memory 211 (S402: YES), the CPU 102 advances the process to step S403. In step S403, the CPU 102 judges whether there is subsequent print data or not by the print data transmission/reception control section 209. Here, whether there is subsequent print data or not is judged on the basis of whether the data transmission/reception control section 203 has received TCP FIN data (a FIN packet) from the external apparatus. If judging that there is not subsequent data (S403: NO), the CPU 102 causes the print data reception process to be ended by the print data transmission/reception control section 209, and, thereby, the present process ends. When judging that there is subsequent data (S403: YES), the CPU 102 advances the process to step S404.

Figure 7B:
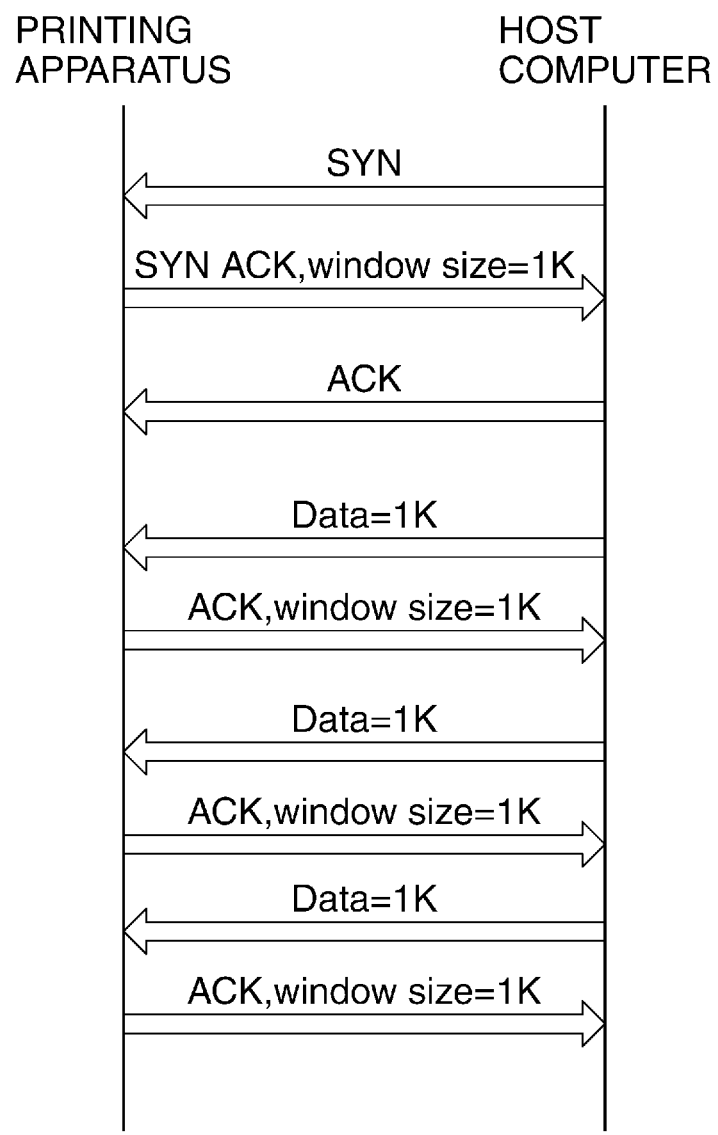
FIG. 7B is a diagram showing an example of a communication flow in which reception performance decreases in the communication flow of performing the automatic receive-window tuning in the conventional technique.

In step S404, the CPU 102 determines the window size to be included in the next response data by the data transmission/reception control section 203. For example, if there is a sufficient free buffer memory space in the data reception memory 204, and the data transmission speed from the external apparatus is high, the data transmission/reception control section 203 determines a larger window size. By setting the window size large depending on the situation, higher communication speed can be realized. It should be noted that a communication flow in the case of setting a large value for the window size is similar to FIG. 7A.

On the other hand, it can be conceivable that there is not a sufficient free buffer memory space in the data reception memory 204, and the data transmission/reception control section 203 cannot receive any more print data. In this case, the window size is set to "zero (0)" in step S404 so that the external apparatus does not transmit print data. If the data transmission speed from the external apparatus is low, the CPU 102 judges that it is not necessary to increase the window size and determines the same value as the window size then, by the data transmission/reception control section 203.

In the next step S405, the CPU 102 transmits the response data which includes the window size determined in step S404 to the external apparatus via the network communication driver section 201 by the data transmission/reception control section 203. After that, the CPU 102 returns the process to step S401 and repeats the data reception process from steps S401 to S406 up to the end. It should be noted that the "print data" judged in step S401 at the time of returning from step S405 to step S401 is subsequent data.

According to the above embodiment, the printing apparatus 100 confirms the states of the data reception memory 204 and the print data reception memory 211 to change the window size to respond with. Therefore, it is possible to solve both of the problem of disappearance of print data and the problem of slow print data reception speed, and it is possible to realize communication speed that is always optimum and high.

In the above embodiment, the CPU 102 prevents disappearance of print data by referring to the data reception memory 204 and the print data reception memory 211 and determining the window size to respond with, by the window size control section 205. However, depending on the configuration of the printing apparatus 100, there may be other cases where print data cannot be received. For example, as cases where print data cannot be received because of a factor other than insufficient memory, a case where an error has occurred because of a fault in hardware of the printer section 107 or a case where some error has occurred because of a trouble of an internal system are given.

Figure 5:
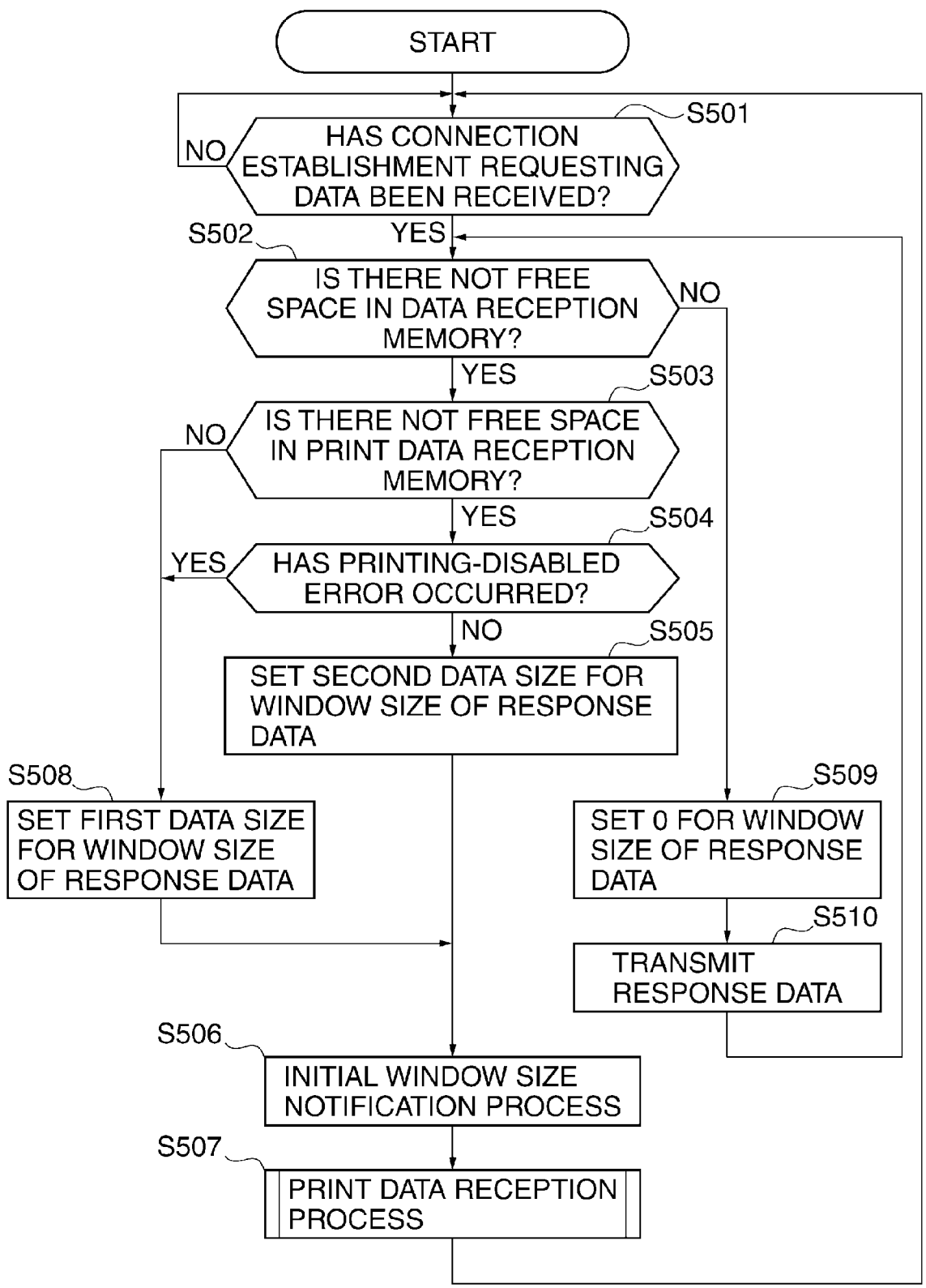
FIG. 5 is a flowchart of the print data reception process in a case where a printing-disabled error has occurred in the printing apparatus in FIG. 1.

In such cases also, it is necessary to decrease the value of the window size to respond with to prevent disappearance of print data similarly to the above embodiment. A print data reception process for coping with this problem will be described with reference to a flowchart in FIG. 5. FIG. 5 is a flowchart of the print data reception process in the case where a printing-disabled error has occurred in the printing apparatus 100. Each process shown in FIG. 5 is realized by the CPU 102 developing a predetermined program stored in the ROM 104 or the HDD 105 on the work area of the RAM 103 and executing the program.

Since processes in steps S501 to S503, S509 and S510 are the same as the processes in steps S301 to S303, S308 and S309 in FIG. 3, respectively, description thereof will be omitted here. If judging in step 503 that there is not a free buffer memory space in the print data reception memory 211 (S503: NO), the CPU 102 advances the process to step S508. On the other hand, if judging that there is a free buffer memory space in the print data reception memory 211 (S503: YES), the CPU 102 advances the process to step S504.

In step S504, the CPU 102 inquires of the print data receivability judging section 210 whether print data can be received or not, through the print data transmission/reception control section 209. On the basis of a result of this inquiry, the CPU 102 judges whether or not a printing-disabled error has occurred in the printing apparatus 100, by the print data receivability judging section 210.

If the error has occurred (S504: YES), the print data receivability judging section 210 responds to the print data transmission/reception control section 209 that, since the printing-disabled error has occurred, reception of print data is impossible. As a result, the CPU 102 advances the process to step S508. On the other hand, if the error has not occurred (S504: NO), the print data receivability judging section 210 responds to the print data transmission/reception control section 209 that, since the printing-disabled error has not occurred, reception of print data is possible. As a result, the CPU 102 advances the process to step S505.

Since the processes in step S508 and step S505 are the same as steps S307 and S304 in FIG. 3, respectively, description thereof will be omitted here. After step S505 or S508, the CPU 102 advances the process to step S506. Since processes in steps S506 and S507 are the same as the processes in steps S305 and S306 in FIG. 3, respectively, description thereof will be omitted here.

According to the process of the flowchart in FIG. 5, the printing apparatus 100 can confirm the states of the data reception memory 204 and the print data reception memory 211 and the printing enabled/disabled state of the printing apparatus 100 to change the window size to respond with. Therefore, even when the printing apparatus 100 is in the printing-disabled state, the problem of disappearance of print data can be solved.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247633, filed Nov. 29, 2013, which is hereby incorporated by reference herein in its entirety.

What is claimed is:
1. A communication apparatus communicable with an external apparatus, comprising:
    a first storage device configured to store data transmitted from the external apparatus;
    a second storage device configured to store data transferred from said first storage device;
    a determination unit configured to, in a case of executing communication with the external apparatus, determine a notification size to be notified to the external apparatus as a size of data that can be received by the communication apparatus on a basis of a size of a free space of said first storage device and a size of a free space of said second storage device; and
    a notification unit configured to notify the notification size determined by said determination unit to the external apparatus,
    wherein if the free space does not exist in said first storage device, said determination unit determines the notification size to be 0,
    if the free space exists in said first storage device, and the free space does not exist in said second storage device, said determination unit determines the notification size to be a first size larger than 0, and
    if the free space exists in both of said first storage device and said second storage device, said determination unit determines the notification size to be a second size larger than the first size,
    wherein said determination unit and said notification unit are implemented at least in part by a processor executing at least one program recorded on a memory device.

2. The communication apparatus according to claim 1, wherein said determination unit determines an initial window size to be notified to the external apparatus.

3. A communication control method for a communication apparatus communicable with an external apparatus comprising a first storage device configured to store data transmitted from the external apparatus and a second storage device configured to store data transferred from said first storage device, the communication control method comprising:
    determining, in a case of executing communication with the external apparatus, a notification size to be notified to the external apparatus as a size of data that can be received by the communication apparatus on a basis of a size of a free space of said first storage device and a size of a free space of said second storage device; and
    notifying the determined notification size to the external apparatus,
    wherein if the free space does not exist in said first storage device, the notification size is determined to be 0,
    if the free space exists in said first storage device, and the free space does not exist in said second storage device, the notification size is determined to be a first size larger than 0, and
    if the free space exists in both of said first storage device and said second storage device, the notification size is determined to be a second size larger than the first size.

4. A computer-readable non-transitory storage medium storing a program for causing a computer to implement a communication control method for a communication apparatus communicable with an external apparatus comprising a first storage device configured to store data transmitted from the external apparatus and a second storage device configured to store data transferred from said first storage device, the communication control method comprising:
    determining, in a case of executing communication with the external apparatus, a notification size to be notified to the external apparatus as a size of data that can be received by the communication apparatus on a basis of a size of a free space of said first storage device and a size of a free space of said second storage device; and
    notifying the determined notification size to the external apparatus,
    wherein if the free space does not exist in said first storage device, the notification size is determined to be 0,
    if the free space exists in said first storage device, and the free space does not exist in said second storage device, the notification size is determined to be a first size larger than 0, and
    if the free space exists in both of said first storage device and said second storage device, the notification size is determined to be a second size larger than the first size.

5. A printing apparatus communicable with an external apparatus, comprising:
    a first storage device configured to store print data transmitted from the external apparatus;
    a second storage device configured to store print data among data stored in said first storage device;
    a printing device configured to execute a printing process on a basis of the print data stored in said second storage device;
    a determination unit configured to, in a case of executing communication with the external apparatus, determine a notification size to be notified to the external apparatus as a size of data that can be received by the printing apparatus on a basis of a size of a free space of said first storage device and a size of a free space of said second storage device; and
    a notification unit configured to notify the notification size determined by said determination unit to the external apparatus,
    wherein if the free space does not exist in said first storage device, said determination unit determines the notification size to be 0,
    if the free space exists in said first storage device, and the free space does not exist in said second storage device, said determination unit determines the notification size to be a first size larger than 0, and
    if the free space exists in both of said first storage device and said second storage device, said determination unit determines the notification size to be a second size larger than the first size,
    wherein said determination unit and said notification unit are implemented at least in part by a processor executing at least one program recorded on a memory device.

6. The printing apparatus according to claim 5, wherein said determination unit determines an initial window size to be notified to the external apparatus.

7. A communication method for a printing apparatus, the method comprising:
    storing, in a first storage device, print data transmitted from an external apparatus;
    storing, in a second storage device, print data among data stored in said first storage device;
    executing a printing process on a basis of the print data stored in said second storage device;
    determining, in a case of executing communication with the external apparatus, a notification size to be notified to the external apparatus as a size of data that can be received by the printing apparatus on a basis of a size of a free space of said first storage device and a size of a free space of said second storage device; and
    notifying the determined notification size to the external apparatus,
    wherein if the free space does not exist in said first storage device, the notification size is determined to be 0,
    if the free space exists in said first storage device, and the free space does not exist in said second storage device, the notification size is determined to be a first size larger than 0, and
    if the free space exists in both of said first storage device and said second storage device, the notification size is determined to be a second size larger than the first size.

8. A computer-readable non-transitory storage medium storing a program for causing a computer to implement a communication method for a printing apparatus, the method comprising:
    storing, in a first storage device, print data transmitted from an external apparatus;
    storing, in a second storage device, print data among data stored in said first storage device;
    executing a printing process on a basis of the print data stored in said second storage device;
    determining, in a case of executing communication with the external apparatus, a notification size to be notified to the external apparatus as a size of data that can be received by the printing apparatus on a basis of a size of a free space of said first storage device and a size of a free space of said second storage device; and
    notifying the determined notification size to the external apparatus,
    wherein if the free space does not exist in said first storage device, the notification size is determined to be 0, if the free space exists in said first storage device, and the free space does not exist in said second storage device, the notification size is determined to be a first size larger than 0, and if the free space exists in both of said first storage device and said second storage device, the notification size is determined to be a second size larger than the first size.

\* \* \* \* \*